United States Patent [19]

Irie

[11] Patent Number: 4,468,267
[45] Date of Patent: Aug. 28, 1984

[54] MANUFACTURING A RADIAL TIRE AND APPARATUS FOR PRACTICING SAID METHOD

[75] Inventor: Nobuhiko Irie, Nagasaki, Japan
[73] Assignee: Mitsubishi Jukogyo Kabushiki Kaisha, Japan
[21] Appl. No.: 387,216
[22] Filed: Jun. 10, 1982
[30] Foreign Application Priority Data
  Jun. 18, 1981 [JP] Japan .................... 56-94381
[51] Int. Cl.³ .................. B29H 17/20; B29H 17/22
[52] U.S. Cl. .................... 156/132; 156/133; 156/135; 156/403; 156/417
[58] Field of Search ............ 156/131, 132, 133, 135, 156/403, 414–420, 422, 421.4, 421.8

[56] References Cited

U.S. PATENT DOCUMENTS

| | | | |
|---|---|---|---|
| 3,127,294 | 3/1964 | Porter | 156/131 |
| 3,257,255 | 6/1966 | Batten | 156/131 |
| 3,645,818 | 2/1972 | Frazier | 156/131 |

FOREIGN PATENT DOCUMENTS

| | | | |
|---|---|---|---|
| 50-2625 | 1/1975 | Japan . | |
| 52-1951 | 1/1977 | Japan . | |
| 55-135648 | 10/1980 | Japan . | |
| 55-135647 | 10/1980 | Japan . | |
| 57-178839 | 11/1982 | Japan . | |
| 1001056 | 8/1965 | United Kingdom | 156/131 |

*Primary Examiner*—Lois E. Boland
*Attorney, Agent, or Firm*—McGlew and Tuttle

[57] ABSTRACT

A method of manufacturing a tire comprises a first process including the steps of forming a carcass ply or the like to a cylindrical configuration, placing bead cores on the cylindrical carcass ply and then effecting assembly of a carcass ply-bead core structure. A second process of the method includes the steps of receiving the structure from the last step in the first process, effecting assembly of a cylindrical carcass layer and then deforming the latter into a trochoidal configuration to obtain a green tire, wherein the carcass ply located between both the bead cores on the structure is caused to expand either in the first process or in the second process. The structure is placed on a drum device in the second process, the bead cores are wrapped with the end portions of the carcass ply and then the green tire for the radial tire is assembled by attaching side wall members or the like. Further, according to other aspect of the present invention an apparatus for practicing the above-described method is also disclosed.

2 Claims, 25 Drawing Figures

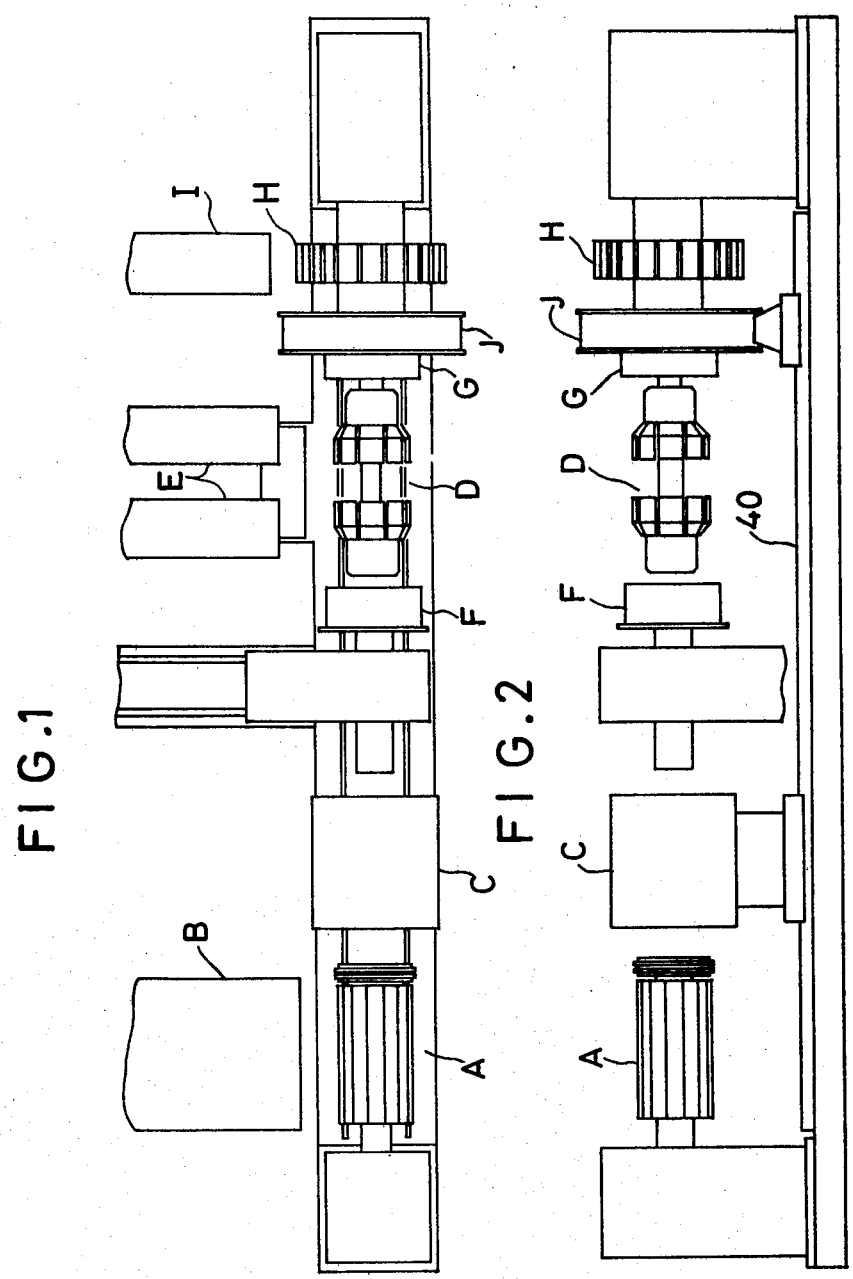

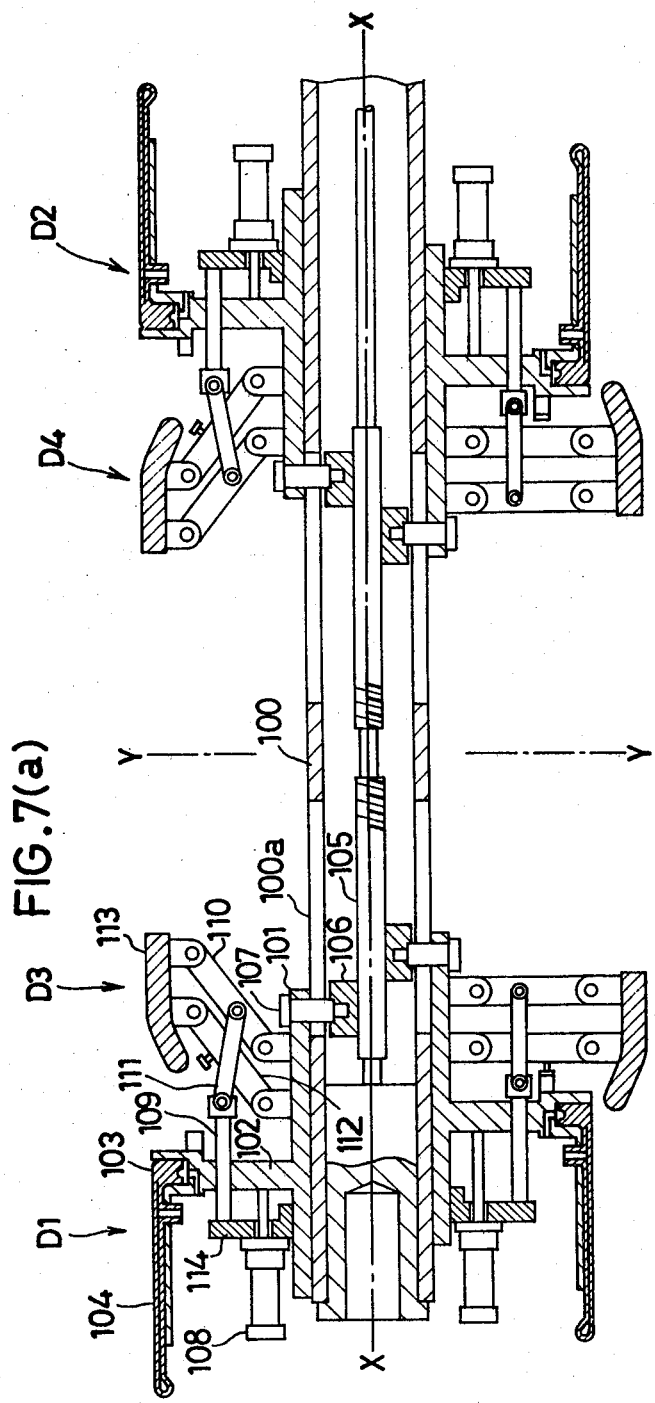

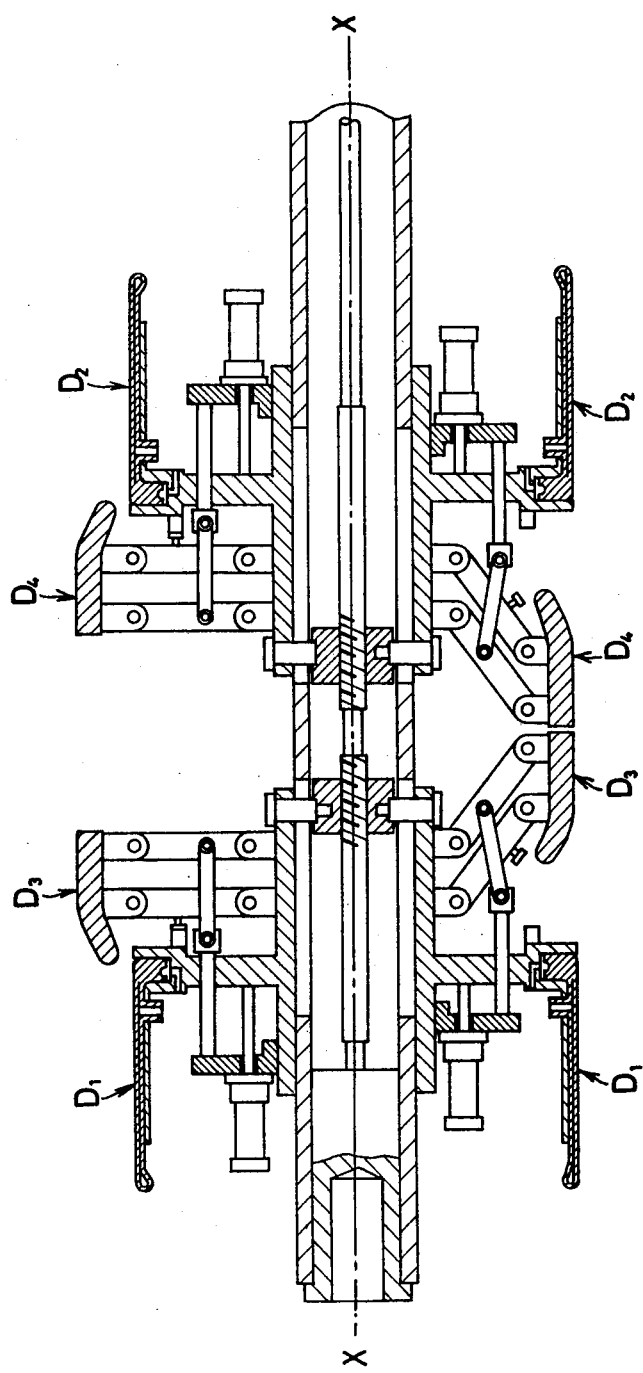

MANUFACTURING A RADIAL TIRE AND APPARATUS FOR PRACTICING SAID METHOD

FIELD AND BACKGROUND OF THE INVENTION

The present invention relates to a method of manufacturing a radial tire and an apparatus for practicing said method.

As is well known, a conventional method of manufacturing a radial tire is generally classified into a single stage type molding method and a double stage type molding method.

The single stage type molding method is practiced by way of the steps of first winding a material for a carcass layer on a drum device which is designed so as to expand and contract, placing bead cores at the predetermined position, allowing the drum device to expand so as to deform the cylindrical configuration into a trochoidal one, and then winding a breaker ply and a tread thereon or allowing the carcass layer to expand to the inner wall of a breaker-tread structure which is previously prepared.

On the other hand, the double stage type molding method is practiced by way of the steps of assembling a cylindrical carcass layer on a drum device in the first stage, said drum device being designed so as to expand and contract, removing the carcass ply from the drum device to transport the same, placing the carcass layer on another drum device in the second stage, said drum device being designed so as to expand and contract, deforming the cylindrical configuration of the carcass layer into a trochoidal one and then winding a breaker ply and a tread or allowing the carcass layer to expand to the inner wall of a breaker-tread structure which is previously prepared.

As is apparent from the above description, the single stage type molding method is free from the troublesome operation in the double stage molding method which comprises the step of displacing the cylindrical carcass layer from the drum device in the first stage to the drum device in the second stage, but it includes a number of problems because it is necessary to exactly locate a material to be assembled and effect firm assembling under pressure. Further, another disadvantageous feature of the single stage type molding method is that a distance between the adjacent cords is not distributed uniformly in the peripheral direction while the carcass ply is kept in an expanded state, because the carcass ply is expanded and comes in tight contact with the lower part of the bead cores, after the latter are placed on the cylindrical carcass ply.

Besides this a modified method is also proposed which includes the steps of previously assembling a carcass ply to a cylindrical configuration, transporting the assembled carcass ply to a drum device in the second stage with the aid of a transporting device, said drum device being designed so as to expand and contract, placing bead cores outward of the carcass ply, and then allowing the carcass ply to expand toward the lower portion of the bead cores so that they are brought in pressure contact with one another. However, it is found that the modified method has a drawback that during the pressure contact therebetween the cylindrical carcass is caused to expand and thereby fiber distribution density in the material loses its uniformity.

Further, another modified method is proposed which includes the steps of previously assembling a carcass ply to a cylindrical configuration, locating bead cores on the assembled carcass ply, allowing the latter to expand toward the lower area of the bead cores so that they are brought in pressure contact with one another while the bead cores are subjected to expansion, transporting the carcass ply-bead core assembled structure to a drum device in the second stage which is designed so as to expand and contract, and then effecting tire molding on said drum device. However, it is also found that the above second modified method has the same drawback as that of the preceding modified method, that is, fiber distribution density in the carcass ply loses its uniformity.

On the other hand, the double stage molding method is preferably practiced with the aid of a so-called high crown type drum which is designed so as to expand and contract for the purposes of ensuring that the material in the vicinity of the bead cores is hardly deformed or dislocated when a trochoidal configuration is achieved in the second stage as well as when final molding is effected in a vulcanizing die assembly.

However, it is found that a trouble or failure tends to occur with the high crown type drum during the step of winding a carcass ply, because it has an outer diameter which is substantially larger than the inner diameter of the bead cores.

Specifically, due to the arrangement that the bead cores are wrapped with the end portions of the carcass wound around an increased diameter a trouble or failure occurs that wrinkles appear in the vicinity of the bead cores when deforming the carcass inwardly in the radial direction (to achieve a reduced diameter). Another drawback is that incorrect location of the ply cords in the vicinity of the bead cores has an effect on incorrect location of the ply cords when deforming to a trochoidal configuration on the drum device in the second stage.

In order to obviate the drawbacks as described above to some extent a modified method is preferably employed which includes the steps of preparing a cylindrical carcass ply which has a diameter close to that of the bead cores, transporting it to a drum in the first stage, placing the bead cores on the carcass ply with the drum in the first stage expanded and thereby making a preparation prior to wrapping the bead cores.

It is true that the modified method has an advantage that no wrinkle appears. However, it is found that incorrect location of the ply cords occurs unavoidably at the shoulder parts of the drum, because sector pieces for constituting the drum surface are displaced as the drum is caused to expand.

The ply cords at the bead portions are held in a substantially correct location but they are not in a perfectly correct location. It should be noted that the incorrect location of the above-described type can not be remedied during the step of deforming to a trochoidal configuration.

SUMMARY OF THE INVENTION

Thus, the present invention is intended to perfectly obviate the drawbacks inherent in the conventional methods as described above.

It is an object of the present invention to provide a method of manufacturing a radial tire at a substantially increased dimentional accuracy and improved productivity.

It is an other object of the present invention to provide an apparatus for practicing the above-described method.

Specifically, the present invention consists in an improved method of manufacturing a tire which essentially comprises a first and a second process, said first process including the steps of forming a carcass ply or the like to a cylindrical configuration, placing bead cores on the cylindrical carcass ply and then effecting assembly of a carcass ply-bead core structure, while said second process including the steps of receiving the structure transported from the last step in the first process, effecting assembly of a cylindrical carcass layer and deforming the latter into a trochoidal configuration to obtain a green tire, wherein the carcass ply located between both the bead cores of the structure is caused to expand either in the first process or in the second process. The structure is placed on a drum device in the second process, the bead cores are wrapped with the end portions of the carcass ply and then the green tire for the radial tire is assembled by attaching side wall members and others.

Since an arrangement is made such that the carcass ply-bead core structure is correctly assembled in the first process and the carcass ply located between both the bead cores is caused to expand previously prior to placing the structure on the drum device in the second process, it is ensured that an occurrence of irregular distribution of a distance between the adjacent ply cords at the drum shoulder portions is effectively prevented. Further, since an arrangement is made such that the carcass ply is deformed to a trochoidal configuration and then the green tire is assembled without any necessity for displacement of the cylindrical carcass layer, it is ensured that no troublesome operation such as removal, transportation and location of the cylindrical carcass layer is required. Furthermore, since an arrangement is made such that assembling of the carcass ply-bead core structure and completion of the green tire are effected in a separate step respectively, it is ensured that manufacturing is effected at an excellent efficiency.

Hence, it is possible to effect manufacturing of a green tire in a strictly exact manner and with improved productivity.

Further, the present invention consists in an apparatus for manufacturing a radial tire which essentially comprises a pair of symmetrically located shoulder formers including a plurality of sector pieces which are expandable and contractive in the radial direction, a pair of symmetrically located bead lock seals located outward of said shoulder formers, said bead lock seals being also expandable and contractive in the radial direction, and a pair of symmetrically located turnup bladders located outward of said bead lock seals, said turnup bladders being expandable in the radial direction, wherein the shoulder formers, the bead lock seals and the turnup bladders are constructed so as to move toward or away from the oppositely located one in a synchronous and symmetrical relation.

Since the apparatus of the present invention as described above makes it possible to effect wrapping of the bead cores with the end portions of the carcass ply and attaching of the side wall members and others on a practically solid cylindrical configuration generated by means of the shoulder formers during the assembling of the cylindrical carcass layer, it is ensured that assembling is effected in a strictly exact manner. Further, since an arrangement is made such that the shoulder formers, the bead lock seals and the turnup move toward or away from the oppositely located one in a synchronous and symmetrical relation, it is ensured that assembling of the cylindrical carcass layer is effected on them and at the same time expansion of the carcass layer located between both the bead cores and deformation of the same into a trochoidal configuration are effected with a distance between both the bead cores reduced.

Other objects and advantageous feature of the present invention will be readily apparent from a reading of the following description made in connection with the accompanying drawings which illustrate a preferred embodiment of the present invention.

BRIEF DESCRIPTION OF THE DRAWINGS

Now the present invention will be described in a greater detail with reference to the accompanying drawings in which:

FIG. 1 is a plan view of the whole system to which the present invention is applied.

FIG. 2 is a front view of the system in FIG. 1.

FIGS. 7(a) to (d) are each a partial sectional view of a carcass forming drum respectively, wherein four different operative positions are shown in both the upper and lower parts of the drawings.

DESCRIPTION OF THE PREFERRED EMBODIMENT

Figure 3:
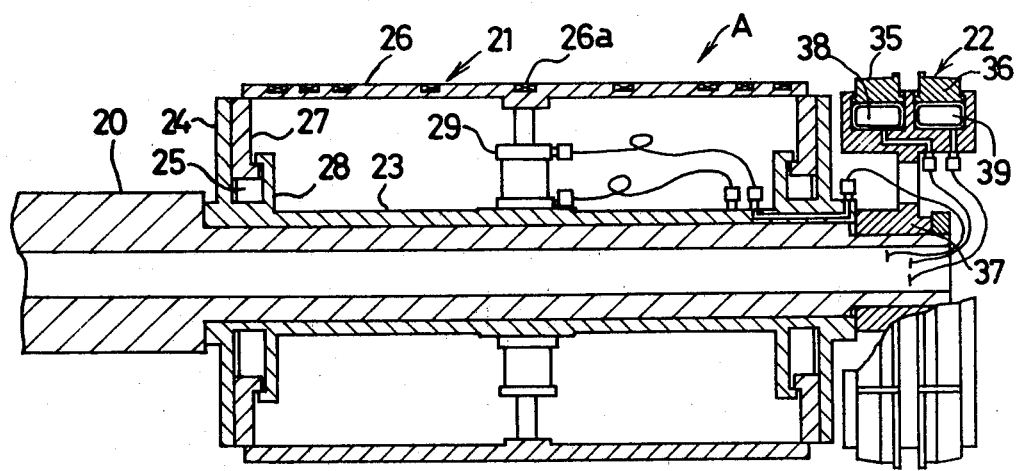
FIG. 3 is a vertical sectional view of a carcass band assembling former A.

Referring to the accompanying drawings, FIG. 1 is a plan view illustration of an arrangement of the whole system where a method in accordance with the present invention is practiced and FIG. 2 is a front view of the system in FIG. 1, wherein reference letter A designates a carcass band assembling former on which a carcass band is assembled and the assembled band includes bead cores wound therearound, reference letter B designates a supply device for delivering materials required for the assembly of the carcass band, reference letter C designates a transporting device for an assembly of the carcass band and the bead cores, reference letter D designates a carcass forming drum on which a layered structure of the carcass is cylindrically shaped and then the cylindrical carcass structure is deformed to a trochoidal shape, reference letter E designates a supply device for delivering materials required for the cylindrical carcass structure, and reference numeral F designates a pushing device for serving to wrap the bead core portion on the left-hand side of drum D. It should be noted that said pushing device may be omitted when the carcass forming drum D is equipped with a double bladder. Further, reference letter G designates a pushing device serving to wrap the bead core portion on the right-hand side of drum D, reference letter H designates an assembling drum for a breaker tread structure, reference letter I designates a supply device for delivering materials required for the breaker tread structure, and reference letter J designates a transporting device for the breaker tread structure.

First, the carcass band assembling former A will be described below.

As shown in FIG. 3, the carcass band assembling former A comprises a ply former 21 and a bead holder 22, said ply former 21 being coaxially arranged on a shaft 20 so as to rotate together with the shaft 20.

The ply former 21 includes a sleeve 23, discs 24 radially extending at both the end parts of said sleeve 23, said discs 24 being formed with a groove 25 respectively, a plurality of sector-shaped segments 26 with a predetermined number of magnets $26_a$ firmly embedded on the outer surface thereof, guides 27 extending inwardly from said segments 26 to be slidably fitted into said grooves 25, stoppers 28 serving to define a radial displacement of said guides 27 and a plurality of hydraulic cylinder units 29 disposed between the segments 26 and the sleeve 23. The sector-shaped segments 26 are radially extendable within an extent as defined by means of the stoppers 28. When the segments 26 are extended to the outermost position, their outer surfaces generate a closed cylindrical surface whose diameter is smaller than the inner diameter of the bead cores by the thickness of a material (carcass ply) to be wound. On the other hand, when they are extended inwardly in the radial direction they are located at the contacted position where their diameter is substantially smaller than the inner diameter of the bead cores. It should be noted that the grooves 25, the guides 27 and the stoppers 28 are dimensioned so that the segments 26 are alternately located at the innermost contracted position when they are displaced inwardly.

Specifically, an arrangement is made such that the segments 26 of which radial displacement is dimentioned larger than that of the adjacent segments 26 are first displaced inwardly in the radial direction and subsequently the latter ones are displaced inwardly in the same direction so that all the segments 26 are located in close contact with one another in a side-by-side relation when they reach the innermost contracted position. The time lag determined for delayed displacement of the latter segments 26 is controlled by the time when hydraulic liquid is delivered to the corresponding hydraulic cylinder units 29.

Figure 4:
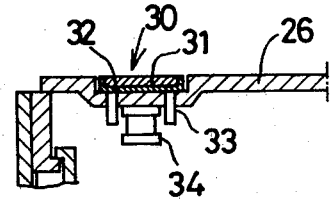
FIG. 4 is a partial sectional view of an essential part of the carcass band assembling former A, shown on an enlarged scale.

As shown in FIG. 4, the ply former 21 is provided with a bead lock device 30 in the vicinity of both the ends of the respective segments 26 where the bead cores are to be located, said bead lock device 30 having a width sufficiently larger than the thickness of the bead cores and being adapted to protrude outward of the segment 26. Specifically, the bead lock device 30 includes a segment 32 with a resilient member 31 received in a recessed part on the segment 26, a plurality of pins 33 extending downwardly from said segment 32 to slide through the holes on the segment 26 which serve as guide means and a hydraulic cylinder unit 34 disposed between both the segments 26 and 32. The resilient member 31 has an outer surface with a curvature which is dimensioned to be the same as to that of the segment 26 and thereby the outer surface of the member 31 becomes flush with that of the latter when the former is received in the recessed part on the segment 26.

In the meanwhile, the bead holder 22 is located at the shaft end part of the ply former 21 where no bearing is provided and comprises a holder half 35 for the left-hand bead core and a holder half 36 for the right-hand bead core. The respective holder halves 35 and 36 are constructed of a plurality of sector pieces and are mounted on the peripheral portion of a radially extending hub 37 which is fixedly mounted on the shaft 20, wherein air bags 38 and 39 adapted to expand or contract individually in the radial direction are disposed between the sector pieces for the holder halves 35 and 36 and the peripheral flange portion of the hub 37 and the air bags 38 and 39 and the sector pieces for the holder halves 35 and 36 are guided in the radial direction by means of the vertically extending walls on the peripheral flange portion of the hub 37. The bead core seating surface of the sector pieces is dimensioned a little larger than the inner diameter of the bead core when they expand to the outermost limit, whereas it is dimensioned substantially smaller than the inner diameter of the bead core and the carcass ply wound around the ply former 21 when they contract to the innermost limit.

Figure 5:
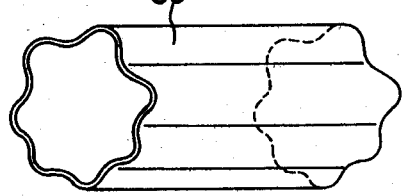
FIG. 5 is a schematic perspective view of a normally corrugated carcass ply deformed from a cylindrical configuration.

After a carcass ply, inner liner or the like is wound on the former A as constructed in the above-described manner, the segments 26 are alternately contracted inwardly in the radial direction whereby the carcass ply is resiliently deformed to a cylinder having a normally corrugated (trochoidal) surface as illustrated in FIG. 5 and thereby it has an outer diameter which is smaller than the inner diameter of the bead core.

After the bead core is located at the predetermined position, the segments 26 are displaced outwardly in the radial direction and at the same time the segments 32 as illustrated in FIG. 4 are extended outwardly. As a result the carcass ply is brought in pressure contact against the inner surface of the bead cores.

After completion of the assembling of the carcass ply and the bead cores the assembled structure can be removed from the former A with the aid of the transporting device C when the segments 26 and 32 and the holder halves 35 and 36 on the bead holder 21 are contracted inwardly so as to allow their outer diameter to be reduced.

As is well known, the material supply device B is designed and constructed in a variety of types and any suitable one is available for the present invention. Thus, further detailed description will not be required.

Figure 6:
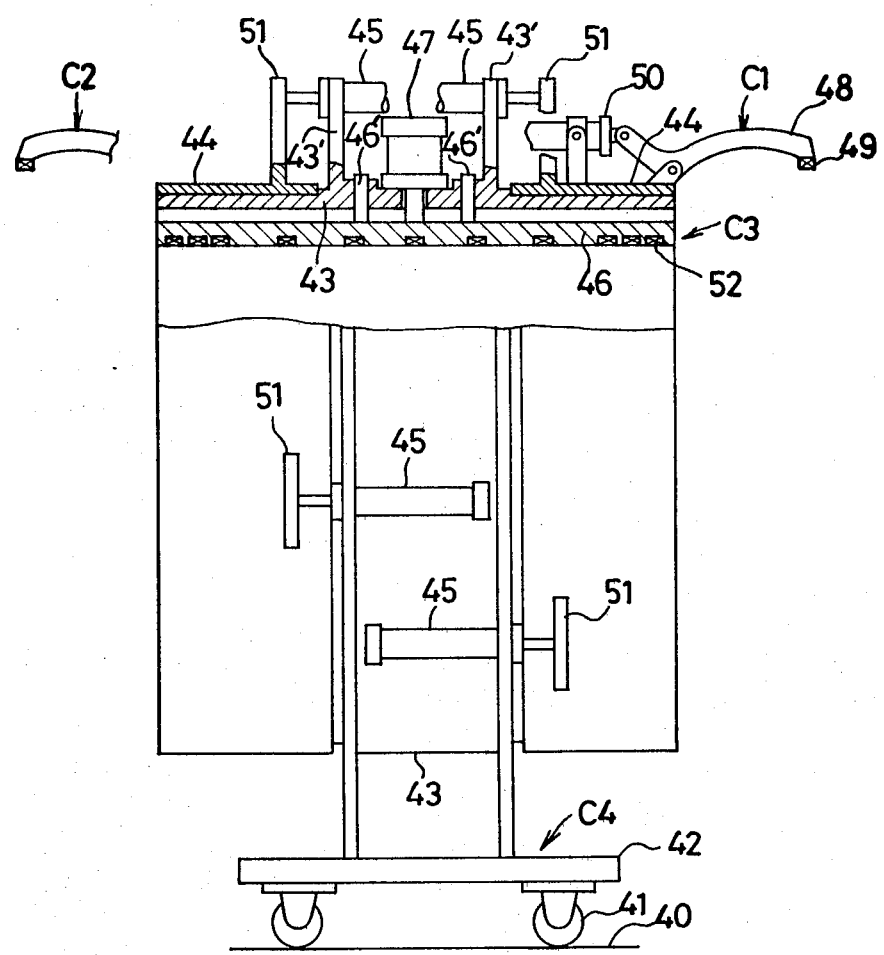
FIG. 6 is a front view of a transporting device C of which the upper part is shown in a sectional view.

As shown in FIG. 6, the transporting device C includes bead holding devices $C_1$ and $C_2$ for serving to hold the bead cores in the predetermined position which have been prepared in the aforesaid former A, an outward expansion limiting device $C_3$ for defining a radial expansion of the carcass ply intermediate the bead cores and a moving wagon $C_4$ adapted to reciprocably move between the former A and the carcass forming drum D.

The moving wagon $C_4$ is equipped with wheels 41 rolling on rails 40 and a chassis 42 carries an annular member 43 which is disposed in a coaxial relation relative to the shaft 20.

The annular member 43 includes cylindrical guide surfaces at both the end parts thereof which extend in a coaxial relation relative to the shaft 20 and the former A. Further, the annular member 43 includes sleeves 44 slidably mounted thereon, said sleeves 44 being fixedly secured to the bead holding devices $C_1$ and $C_2$, and it is formed with radially extending projections onto which a plurality of hydraulic cylinder units 45 are fixedly secured so as to allow the bead holding devices $C_1$ and $C_2$ to be axially displaced.

A sector-shaped member 46 for the outward expansion limiting device $C_3$ is adapted to be radially displaced by means of a hydraulic actuator 47 while it is guided with the aid of members 46'.

Further, the moving wagon $C_4$ is provided with a conventional mechanism for stopping it at the former A and the carcass forming drum D as well as a control device mounted thereon.

The bead holding device $C_1$ includes a sleeve 44 slidably mounted on the annular ring 43, a plurality of arms 48 adapted to swing on the sleeve 44, said arms 48 being fitted with a magnet 48 at the extreme end thereof respectively, a plurality of hydraulic cylinder units 50 of which one end is connected to the arm 48 and of which other end is connected to the sleeve 44, and a plurality of hydraulic cylinder units 45 of which one end is connected to the radial projection 51 on the sleeve 44 and of which other end is connected to the radial projection 43' on the annular ring 43.

As the hydraulic cylinder units 50 extend and thereby the arms swing in the clockwise direction as seen in the drawing, the respective magnets 49 are inwardly displaced in the radial direction to reach a position where they are engaged with the metal wire portion of the bead core but they are not brought in contact with the material wound on the former A.

The bead holding device $C_2$ is designed and constructed in quite the same manner as the aforesaid bead holding device $C_1$. Thus, the bead holding devices $C_1$ and $C_2$ occupy any required axial position on the annular ring 43 respectively and the arms 48 swing to any required angular position.

Further, the outward expansion limiting device $C_3$ includes a plurality of sector pieces 46 radially displaceably suspended from the annular ring 43, a plurality of hydraulic cylinder units 47 for radially displacing the corresponding sector piece 46 and a number of magnets 52 firmly embedded in recessed parts on the inner surface of the respective sector pieces 46.

An arrangement is made such that the sector pieces 46 on the outward expansion limiting device $C_3$ are inwardly displaced in the radial direction alternately by a different distance and specifically one group of the alternately disposed sector pieces 46 have a radial displacement longer than that of the other group so that they come in contact with the carcass ply on the former A when they are displaced to the innermost limit.

When the outward expansion limiting device $C_3$ expands to a midway position, a closed cylindrical surface is formed with the aid of all the sector segments 46, whereas when it expands to the outermost limit, they are located a little outward of said cylindrical surface.

The above-described device is intended to be applied particularly to a steel cord reinforced carcass ply but it should not be limited only to this. As is known, the device may be employed for a textile cord reinforced carcass ply.

The magnets $26_a$ on the former A are effective in deforming a cylindrical carcass ply into the form of a normally corrugated configuration as illustrated in FIG. 5. On the other hand, the magnets 52 on the transporting device C are intended to serve as holding means during transportation. Hence, when a textile cord reinforced carcass ply is in use, both the magnets $26_a$ and 52 are inoperative.

It will be readily understood by any expert of the art that in case of a textile cord reinforced carcass ply the magnets 52 on the sector segments 46 are replaced with conventional vacuum pad means and that in order to ensure a normally corrugated deformation conventional devices similar to a so-called finger ply down employed for the first stage in a manufacturing line are disposed at both the end parts of the former A.

Next, the carcass forming drum D includes a pair of symmetrically disposed bead lock turnup devices $D_1$ and $D_2$ and a pair of symmetrically disposed shoulder formers $D_3$ and $D_4$ located inward of said devices $D_1$ and $D_2$, as illustrated in FIGS. 7(a) to (d).

FIG. 7(a) (upper half above a line X—X) illustrates that the shoulder formers $D_3$ and $D_4$ are folded inwardly and the bead lock turnup devices $D_1$ and $D_2$ are spaced by the longest distance from one another. FIG. 7(b) (lower half below the line X—X) illustrates that the shoulder formers $D_3$ and $D_4$ are expanded and the bead lock turnup devices $D_1$ and $D_2$ are located closer to one another than in FIG. 7(a). FIG. 7(c) (upper half above the line X—X) illustrates that the shoulder formers $D_3$ and $D_4$ are expanded and the bead lock turnup devices $D_1$ and $D_2$ are located closest to one another. FIG. 7(d) (lower half below the line X—X) illustrates that the bead lock turnup devices $D_1$ and $D_2$ are located closest to one another and the shoulder formers $D_3$ and $D_4$ are folded inwardly.

The bead lock turnup devices $D_1$ and $D_2$ includes a sleeve 101 slidably mounted on a shaft 100 which is rotatably supported on a stand (not shown), an expandable bead lock seal 103 fitted into a circular groove on the periphery of a disc 102 radially extending from the sleeve 101 and an expandable bladder 104 disposed on a cylindrical extension from the disc 102 respectively. The bead lock seal 103 is preferably integral with the bladder 104 but the former may be separated from the latter (in the illustrated embodiment the former is integral with the latter).

An arrangement is made such that both the bead lock seal 103 and the bladder 104 are supplied with pressurized air from the outside.

As long as a so-called single bladder is employed for the bladder 104 as shown in the drawing, the pushing devices F and G are required as illustrated in FIGS. 1 and 2. However, when a dual bladder having two layers on the one side is employed, the pushing devices F and G may be omitted.

The sleeve 101 is operatively connected with a screw rod 105 via a nut 106 and a pin 107, said screw rod 105 being rotatably disposed within the shaft 100 while said nut 106 being in screw engagement with the screw rod 105, and said pin 107 extending through a slot $100_a$ formed on the shaft 100.

A difference between both the bead lock turnup devices $D_1$ and $D_2$ consists in that the screw rod 105 and the corresponding nut 106 are threaded in the opposite direction to one another. Besides this there is no difference therebetween.

As the screw rod 105 is rotated, the bead lock turnup devices $D_1$ and $D_2$ move toward one another in a symmetrical manner relative to a center line Y—Y of the drum, whereas as it is rotated in the opposite direction, they move away from one another.

Further, as the bead lock seal 103 is supplied with pressurized air, its outer diameter becomes enlarged and thereby it is brought in pressure contact with the lower portion of the bead core fitted into a carcass band. As a result an airtight chamber is provided between both the pressure contact portions.

It should be noted that the sleeve 101 is fitted with an air seal member (not shown) so as to ensure no leakage of air through a clearance between the shaft 100 and the sleeve 101 during sliding movement of the latter.

The shoulder formers $D_3$ and $D_4$ includes a disc 114 slidably mounted on the sleeve 101 for the bead lock turnup devices $D_1$ and $D_2$, a plurality of hydraulic cylinder units 108 of which one end is fixedly secured to the disc 114 and of which other end is fixedly secured to the disc 102, a plurality of rods 109 fixedly secured to the disc 114 to extend through the disc 102, a plurality of links 111 of which one is connected to the free end of the rod 109 and of which other end is connected to the central part of a link 110 pivotally mounted on the sleeve 101, a plurality of links 112 pivotally mounted on the sleeve 101 in the same manner as the links 110, and a plurality of shoulder segments 113 with the upper end of the links 110 and 112 connected thereto respectively, said rods 109 being fitted with an air seal member (not shown) in order to ensure no leakage of air from the air chamber during sliding movement thereof.

As is apparent from the drawings, the links 110 and 112 have pivotal ends which form four corners of a parallelogram.

As the disc 114 is displaced away from the disc 102 by means of the hydraulic cylinder units 108, the shoulder segments 113 are caused to expand. When they are expanded to the outermost limit, a cylindrical configuration is generated by them so as to allow the side wall portions to be tightly secured in the vicinity of the bead cores.

The material supply device E, the pushing device F and the pushing device G are designed and constructed in a variety of types and any suitable ones are available for the present invention. Thus, no detailed description will be required.

Further, the breaker-tread structure assembling drum H is designed in the form of a practically cylindrical solid drum comprising a plurality of drum segments, said drum having the outer peripheral length which is equal or is substantially equal to the inner peripheral length of a belt to be assembled when they are expanded but which is shorter than the inner peripheral length of the assembled belt-tread structure when they are contracted. For instance, a conventional drum as disclosed in the official gazette of the prior inventions such as Japanese Patent Laid-Open No. 135,647/80, No. 135,648 or the like is available for the present invention.

The drum H as constructed in the above-described manner is mounted in a coaxial alignment with the drum D and the former is adapted to be driven on the shaft 100 independently of the latter.

Any conventional mechanism for driving the drum H independently of the drum D is available for the present invention and therefore no detailed description will be required.

The material supply device I is also designed and constructed in a variety of types and any conventional one is available. Thus, no detailed description will be required.

Further, the transporting device J for the breaker-tread structure comprises a plurality of expandable segments which are designed to surround the whole breaker-tread structure assembled on the drum H and then partly or fully hold the outer surface thereof, wherein a mechanism for expanding or contracting the segment is disposed on a movable wagon which is adapted to move on rails. For instance, a conventional transporting device as disclosed in the official gazette of the prior inventions such as Japanese patent pulication Nos. 1951/77, 2625/75 or the like can be employed for the present invention.

Now operation of the apparatus in accordance with the present invention will be described below.

First, assembling of the carcass band-bead core structure will be described with reference to FIGS. 8(a) to (f).

Figure 8A:
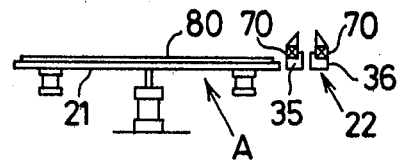
FIGS. 8(a) to (f) are each a schematic front view illustrating assembly operations for a carcass band-bead core structure respectively.

As illustrated in FIG. 8(a), the ply formes 21 are expanded to generate a cylindrical configuration, while a material is delivered from the material supply device B and then is wound on the former A in accordance with the predetermined order. During the winding of the material a carcass ply is attracted to the ply former 21 by means of the magnets $26_a$.

At a certain time both the bead holder halves 35 and 36 are caused to contact. First, the left-hand bead core 70 is located on the left-hand bead holder half 35 and then the latter is expanded, whereby the left-hand bead core 70 is firmly held.

Next, the right-hand bead core 70 is firmly held on the right-hand bead holder half 36 in the same manner as the foregoing.

Figure 8B:
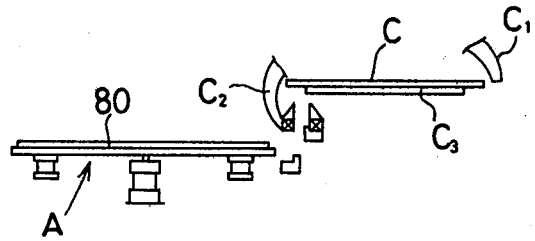

Then, as illustrated in FIG. 8(b), the former A is contracted inwardly in the radial direction so that the wound carcass ply 80 is deformed to the configuration as illustrated in FIG. 5.

The transporting device C starts to move from the waiting position and its stoppes at the position where the left-hand bead holding device $C_2$ is ready for holding the left-hand bead core 70. Then, the arm of the holding device swings in the anticlockwise direction until it comes in contact with the core position of the left-hand bead core 70.

Then, as the sector segments of the left-hand bead holder half 36 are contracted from the position where the left-hand bead core 70 is held, the result is that the latter is transferred to the bead holding device $C_2$.

Figure 8C:
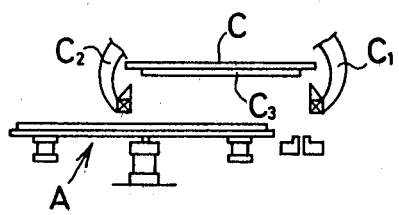

Next, as illustrated in FIG. 8(c), the transporting device C moves further to the left and it stoppes at the position where the right-hand bead holding device is ready for holding the right-hand bead core 70. Thus, the latter is held in the same manner as the foregoing.

Figure 8D:
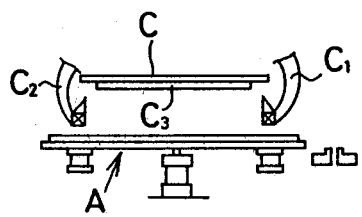

After completion of the holding of both the left-hand and right-hand bead cores 70 the transporting device C moves further to the left and stoppes at the position where both the bead cores are to be located, as illustrated in FIG. 8(d).

Figure 8E:
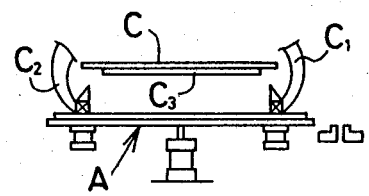
Figure 8F:
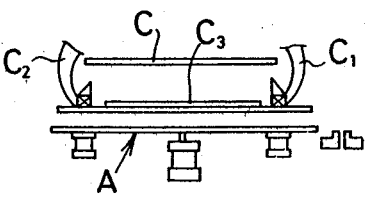

Then, the former A is caused to expand and thereby the carcass ply deformed as illustrated in FIG. 5 is restored to the original cylindrical configuration. As a result the carcass ply 80 is brought in contact with the lower portions of the bead cores 70 as illustrated in FIG. 8(e).

Further, by allowing the segments in the bead lock devices in FIG. 4 to protrude outward it is ensured that the carcass play located in the vicinity of the lower portions of the bead cores is brought in tight contact against the lower portions of the bead cores.

Next, the carcass holding device $C_3$ in the transporting device C is displaced inwardly in the radial direction whereby the outer surface of the carcass ply 80 is attracted to the magnets 52. Then, the former A is contracted inwardly in the radial direction. It is preferable that the magnets $26_a$ on the segment pieces on the former A are demagnetized during the contraction.

Thus, the assembled structure of the cylindrical carcass ply 80 and the bead cores 70 is held in the transporting device C while the bead core portions and the intermediate portion of the carcass ply therebetween are attracted to the magnets.

While the transporting device C is kept in the assembled state as described above, it moves by way of the waiting position and stops at the drum D.

Next assembling of a green tire on the drum D will be described with reference to FIGS. 9(a) to (i).

Prior to receiving the carcass band-bead core assembled structure the drum D is kept in the positional state as illustrated in FIG. 7(a).

Specifically, both the bead lock turnup devices $D_1$ and $D_2$ and the shoulder former $D_3$ and $D_4$ are contracted to the reduced diameter which is substantially smaller than the inner diameter of the assembled structure to be transported.

The distance between both the bead lock seals 103 is dimentioned same to that between both the bead cores on the assembled structure.

Figure 9A:
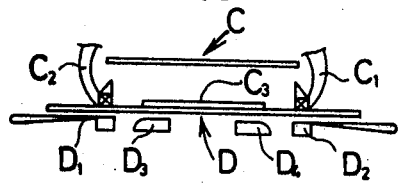
FIGS. 9(a) to (i) are a schematic front view illustrating assembly operations for a green tire respectively.

After completion of the transportation the carcass band-bead core assembled structure is located outward of the drum D of which diameter has been reduced, as illustrated in FIG. 9(a).

Figure 9F:
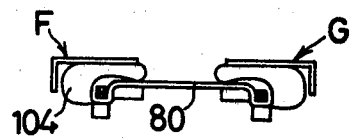
Figure 9B:
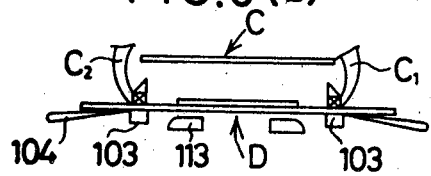

Then, the bead lock seals 103 are expanded as illustrated in FIG. 9(b) whereby the lower portions of the bead cores on the assembled structure are held airtightly.

Figure 9G:
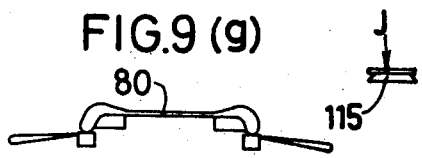
Figure 9C:
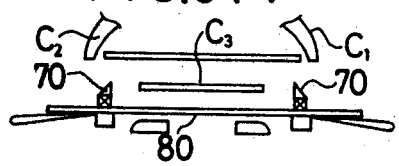

As the lower portions of the bead cores are held, the bead core holding devices $C_1$ and $C_2$ on the transporting device C are caused to swing outwardly as illustrated in FIG. 9(c) whereby the bead cores 70 are released from the firmly held state. At the same time the sector pieces 46 on the carcass holding device $C_3$ which are now holding the carcass ply between both the bead cores are caused to expand.

The sector pieces 46 stop their expansion at the position where the outer diameter of the carcass ply to be expanded in the next step is defined.

Next, the interior of the carcass ply airtightly held by means of both the bead lock seals 103 is supplied with pressurized air and at the same time both the bead lock turnup devices are caused to move toward one another in a symmetrical relation. As a result the carcass ply is expanded between both the bead cores by pressurized air while its expansion is defined to a cylindrical configuration.

Then, the segments 113 on the shoulder former are expanded and thereafter inner pressure is released from the air chamber.

The positional state of the drum device D at this time is as illustrated in FIG. 7(b).

Figure 9H:
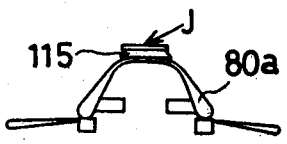
Figure 9D:
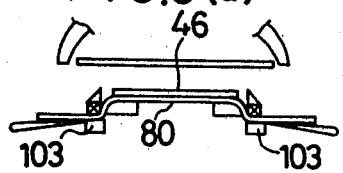
Figure 9I:
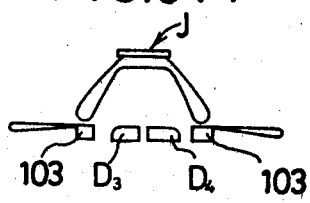
Figure 9E:
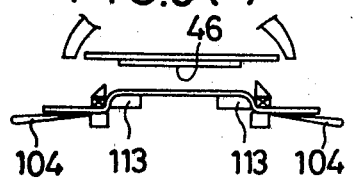

Next, the sector pieces 46 on the outward expansion limiting device are expanded as illustrated in FIG. 9(e) until they reach a diameter larger than the outer diameter of the carcass band-bead core assembled structure on the drum D.

While the above-described positional state is maintained, the transporting device C moves back to the waiting position and then the pushing device F is located in a coaxial alignment with the drum D.

Next, both the bladders 104 on the bead lock turnup devices are caused to expand and thereafter a part of the expanded bladders 104 is horizontally urged toward the center of the drum D while it is defined by means of the pushing devices F and G.

This causes the outer parts of both the bead cores of the carcass band to wrap the bead cores 70 and come in pressure contact against the carcass ply 80.

During the horizontal expansion and pressure contact as described above both the shoulder formers $D_3$ and $D_4$ serves as a pressure support member respectively.

While the above-described expansion is effected on the drum H, the breaker-tread structure assembled on the drum H stands by the drum D with the outer part of the structure held by means of the transporting device J, as illustrated in FIG. 9(g).

After completion of the step as illustrated in FIG. 9(f) other members such as side wall or the like are attached to the structure whereby a cylindrical carcass layer is achieved.

Next, as illustrated in FIG. 9(h), both the shoulder formers $D_3$ and $D_4$ and both the bead lock turnup devices $D_1$ and $D_2$ are caused to move toward one another in a symmetrical relation while the carcass layer is supplied with pressurized air. As a result the cylindrical carcass layer is deformed to a trochoidal configuration.

At a certain time during the above step of operation the previously prepared breaker-tread structure 115 is attached to the central part of the trochoidal carcass $80_a$ and the carcass layer is tightly secured to the aforesaid structure. After completion of the adhesive securing the transporting device J moves back to the waiting position and forming operation under pressure continues to be conducted for a green case on the drum D in accordance with the predetermined operational order.

The positional state on the drum D at this time is as illustrated in FIG. 7(c).

When operations on the drum D are over and thereby the required green tire is obtained, the transporting device J holds the green tire at the outer surface thereof, as illustrated in FIG. 9(i).

After completion of the foregoing holding operation the shoulder formers $D_3$ and $D_4$ and the bead lock seals 113 are contracted.

The positional state on the Drum D at this time is as illustrated in FIG. 7(d). The finished green tire is removed from the drum D with the aid of the transporting device J and thus a series of operations have been completed.

It will be readily understood from the above description that a trochoidal green tire is manufactured by way of the steps of expanding the carcass band-bead core assembled structure prepared on the former A to a cylindrical configuration in the area between both the bead cores, causing the shoulder formers to expand in the cylindrical space, effecting assembly to a cylindrical green case and then deforming the latter to a trochoidal configuration.

Alternatively, the following steps may be employed as briefly described below.

Namely, a required trochoidal green tire is manufactured by way of the steps of expanding the carcass band-bead core assembled structure prepared on the former A to a cylindrical configuration in the area between both the bead cores on the former A, transporting the assembled structure to the drum D with the above configuration maintained, causing the shoulder formers to expand in the cylindrical space, effecting assembly to a cylindrical green case and deforming the latter to a trochoidal configuration.

When the above alternative method is employed, it is of course necessary that the former A and the transporting device C are designed and constructed in a different manner from the foregoing. For instance, a proposal made by the same applicant under Japanese patent application No. 65725/81 may be available for the present invention.

As will be readily understood from the above description, the present invention makes it possible to effect assembling of a carcass layer in a strictly exact manner.

Particularly, it is possible that a carcass ply cord is located in exact alignment with the inner face of the bead cores, that is, a carcass ply cord manufactured in the preceding step (calendar process) under a correct control is attached to the inner face of the bead cores without any damage or injury caused thereon.

Further, when the intermediate portion between both the bead cores of the ply is mounted on a practically solid cylindrical body which has a diameter larger than that of the bead cores, it is possible to prevent the ply cord from being located in a wrong alignment with the drum shoulder portions and thereby effect assembling of a cylindrical carcass layer on the practically solid cylindrical body in a strictly exact manner.

Thus, the present invention makes it possible to effect assembling of a green tire by attaching a trochoidal breaker and a tread without any necessity for displacing the cylindrical carcass layer, resulting in an improved productivity for manufacturing radial tires.

Finally, it should be noted that tire manufacturing at an excellently high efficiency is ensured because of the fact that a NO. (N+1) carcass band is prepared on the drum A while a NO. (N) tire is assembled on the drum D.

The present invention has been described above only with the preferred embodiment of the invention, but it should be of course understood that it should be not limited only to this and it may be changed or modified in a suitable manner without any departure from the spirit and scope of the invention.

What is claimed is:

1. A method of manufacturing a green radial tire having a carcass ply and a pair of bead cores, comprising: forming the carcass ply into a cylindrical shape having an external diameter almost equal to an internal diameter of the bead cores; subsequently transforming the cylindrical carcass ply to assume a circumferentially wave-shaped corrugated carcass ply over an entire length thereof in the axial direction while containing an outer diameter of the carcass ply; arranging a pair of bead cores in selected positions on the wave-shaped corrugated carcass ply which has been contracted in diameter; then normalizing the carcass ply into its cylindrical shape so as to form a structure having the pair of bead cores in contact with the external surface of the carcass ply; expanding the carcass ply in diameter in an area thereof between the pair of bead cores of the structure; then bending end portions of the carcass ply disposed axially outside of the bead cores so as to enclose the bead cores therein within portions of the carcass ply; then assembling a cylindrical carcass layer by incorporating side-wall members with the structure; and transforming said cylindrical carcass layer into a torroidal shape thereby forming a green tire.

2. A method of manufacturing a green tire structure, comprising:
   forming a carcass ply into a cylindrical shape, said carcass ply having an axial length with an external diameter being at most slightly less than an internal diameter of a pair of bead cores;
   changing the shape of said carcass ply to reduce its maximum external diameter and form said carcass ply into a circumferentially corrugated shape which is corrugated along the full axial length of the carcass ply;
   positioning a pair of bead cores adjacent opposite axial ends of said carcass ply having the circumferentially corrugated shape, an end portion of said carcass ply remaining adjacent each bead core and a central portion of said carcass ply disposed between said pair of bead cores;
   returning said carcass ply to its cylindrical shape and to a diameter sufficient to engage the carcass ply with each of the bead cores;
   expanding the central portion of the carcass ply between the pair of bead cores to increase the central portion to a diameter greater than a diameter of said bead cores;
   bending each end portion of the carcass ply over each bead core respectively to enclose each bead core within portions of said carcass ply; and
   transforming the carcass ply with enclosed beads into a torroidal shape with the central portion of said carcass ply bulged radially outwardly to form the green tire.

* * * * *